Feb. 26, 1957 J. E. BUTLER 2,783,416

CIRCUIT HOUSING

Filed June 26, 1953 2 Sheets-Sheet 1

INVENTOR
Joseph E. Butler

BY Cushman, Darby & Cushman
ATTORNEYS

Feb. 26, 1957 J. E. BUTLER 2,783,416

CIRCUIT HOUSING

Filed June 26, 1953 2 Sheets-Sheet 2

INVENTOR
Joseph E. Butler

BY Cushman, Darby & Cushman
ATTORNEYS

United States Patent Office 2,783,416
Patented Feb. 26, 1957

2,783,416

CIRCUIT HOUSING

Joseph E. Butler, Bethesda, Md.

Application June 26, 1953, Serial No. 364,436

12 Claims. (Cl. 317—101)

This invention pertains to circuit housings and specifically to such housings for efficiently and compactly containing magnetic core memory and counting circuits. This invention particularly pertains to the compact housing of such circuits, the housings having connection means such as sockets and prongs for permitting the units to be stacked together to form chains of desired numbers of circuit units.

The particular circuit to be thusly housed is of the magnetic core type having two cores per digit, as described, for example, at page 52 of the Journal of Applied Physics, volume 21, January 1950. It will be understood that no claim is here made to the circuit itself, but only the stackable housing arrangement therefor. Since this invention does not concern the circuit itself, and the circuit is adequately described in the above cited publication and widely known elsewhere, it is thought sufficient to explain briefly for the benefit of those not skilled in the art that such circuits may serve among other purposes, (1) as a means of storing digital information, (2) as a means of transferring information between systems of different pulse rates, (3) as a counter in which any configuration of pulses may be counted or circulated, and (4) as a means of transferring information from serial form to parallel form, or vice versa. There are obviously further uses of such circuits.

This invention permits the above referred to type of circuit to be stackably housed in one of its most convenient and highly demanded forms, viz., in units containing two cores with interconnecting circuitry. There is a primary object of the invention.

A further object of the invention is to provide a connector arrangement permitting units to stack together without soldering, except for purposes of read-in or read-out when required. Read-out and read-in can also be by means of non-soldered connections if desired.

A further object of the invention is to permit stacks of the units or housings to be readily plugged into other equipment.

A further object of the invention is to provide a unit of the above referred to type which is completely enclosed, moisture-sealed and ruggedly constructed.

Further objects and the entire scope of the invention will be in part obvious and in part expressly set forth in the hereinbelow detailed description and in the appended claims.

The invention may be best understood with reference to the accompanying drawings, wherein.

Figures 1, 2, 3, 4, 4A:
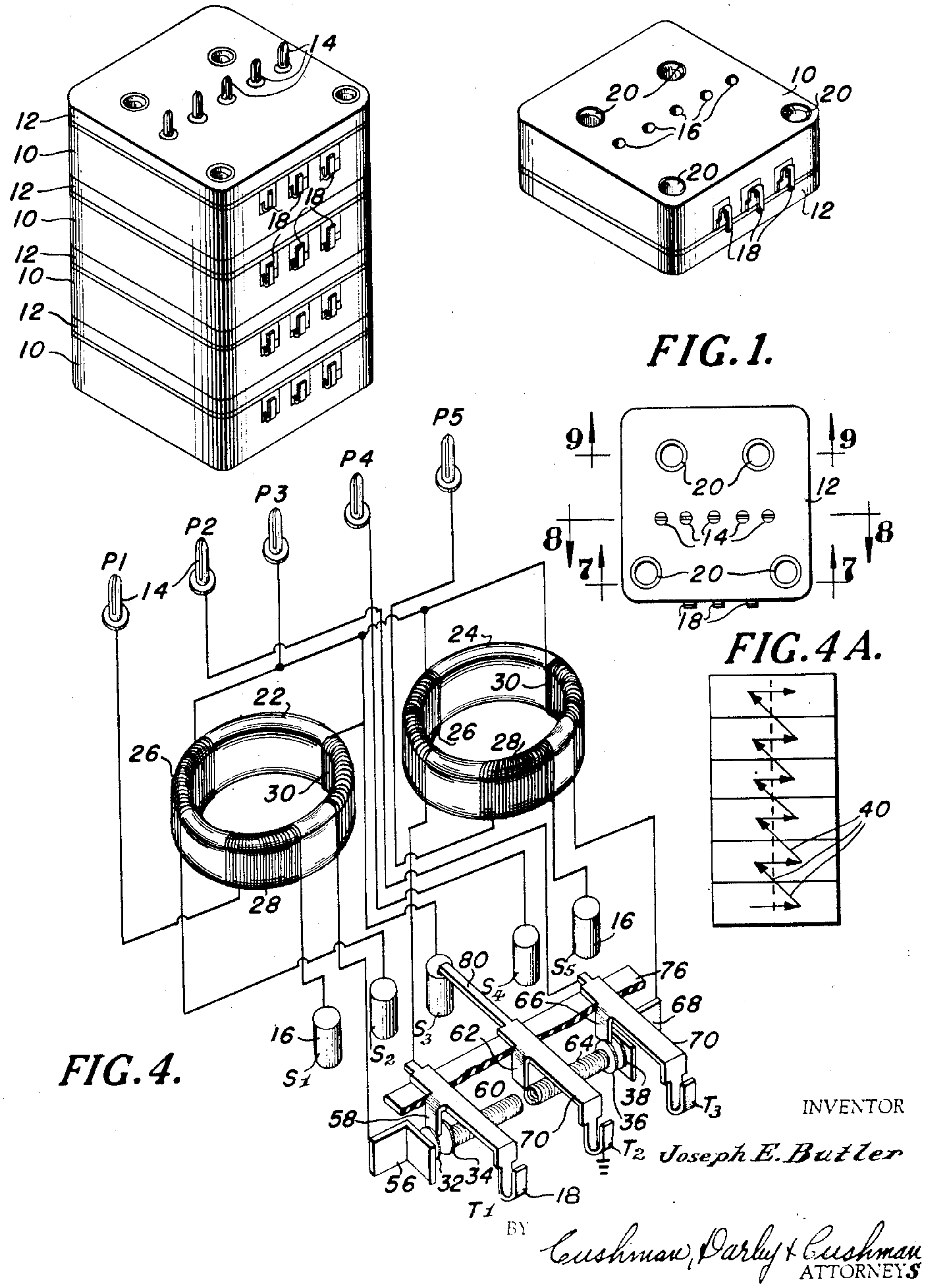
Figure 1 shows a top plan view of a housing or unit according to the invention.
Figure 2 shows an isometric view of the bottom of a unit according to the invention.
Figure 3 shows an isometric view of a stack of four units according to the invention.
Figure 4 shows an exploded view of the circuitry which is housed together with some details of structural arrangement according to the invention.

Figure 4*a* is a diagrammatic showing of the possible course of data through a stack of the units according to the invention.

Figure 5:
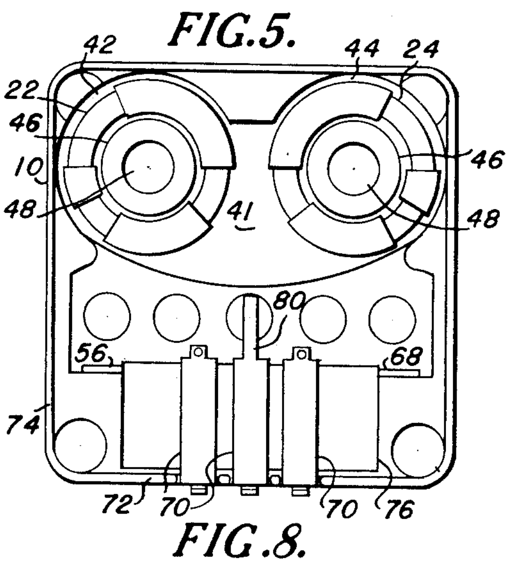

Figure 5 shows a top plan view of a unit according to the invention with a cover member removed.

Figure 6:
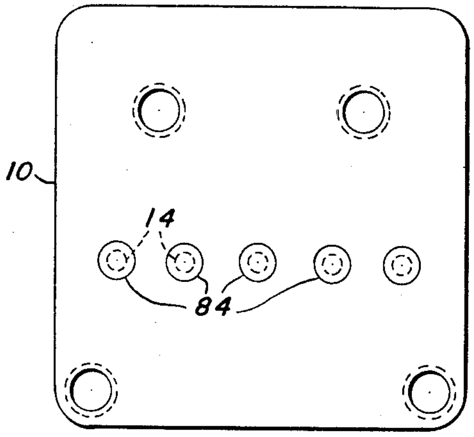

Figure 6 shows a plan view of the inside surface of a cover member.

Figure 7:
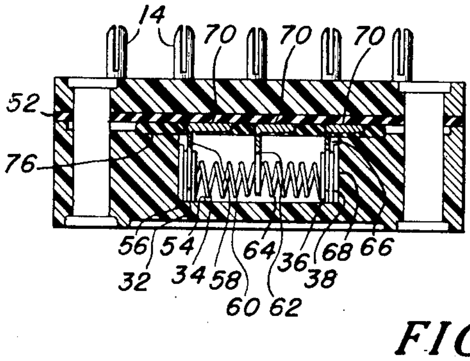

Figure 7 shows a sectional view taken along the line 7—7 of Figure 1.

Figure 8:
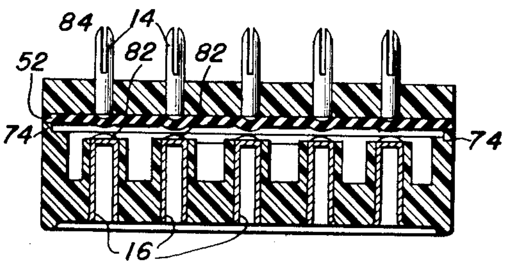

Figure 8 shows a sectional view taken along the line 8—8 of Figure 1, and

Figure 9:
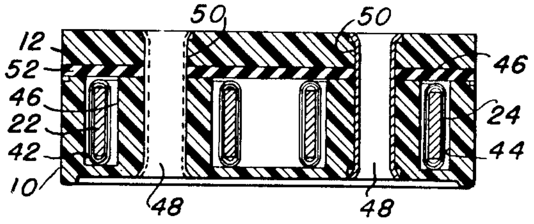

Figure 9 shows a sectional view taken along the line 9—9 of Figure 1.

Referring to Figures 1–3, each unit is characterized by a first member comprising a base 10 and a cover 12 having more or less centrally thereof a row of connector pins 14 extending from the cover 12, and a row of pin sockets 16 in the base 10 and aligned with the pins 14. A row of read-in, read-out terminal ends 18 are positioned along an edge of the base 10. Four hollow rivets 20 are provided for maintaining the base 10 and cover 12 of each unit together and also permitting stacking rods (not shown) to be passed therethrough for permanently connecting together a stack of units.

From the description thus far, it will be understood that any number of units may be conveniently stacked as shown in Figure 3 with the terminal ends 18 aligned at one side of the stack.

Referring now to Figure 4, the circuit connections are shown. Elements corresponding to those already mentioned are correspondingly numbered. The contact pins 14 are designated $P_1$—$P_5$, the pin sockets 16 designated $S_1$—$S_5$ and the terminals 18 designated $T_1$—$T_3$, all reading left to right. Shown in Figure 4 are two magnetic cores 22 and 24. Each core has wound thereon a data input winding 26, an advancing winding 28 and a read-out winding 30. The equivalency of the circuit shown in the above cited article will be immediately apparent. A study of that circuit will show that four rectifying elements are required. In Figure 4, there is a first selenium rectifier disc 32, a second such disc 34, a third such disc 36 and a fourth disc 38. The novel manner in which these discs and other elements to be described are arranged in the housings is a particularly important aspect of this invention. As, will become further apparent, enough space is available to permit inclusion of small resistors, if such are required over and above the inherent resistance of the circuit components.

In Figure 4 it will be observed that socket $S_1$ is connected through advancing winding 28 of core 22 to pin $P_1$. Similarly, socket $S_5$ is connected through advancing winding 28 of core 24 to pin $P_5$. It will be immediately understood that in a stack of circuits as shown in Figure 3, advancing pulse as applied to sockets $S_1$ and $S_5$ will be applied directly in similar fashion through each circuit of the stack.

The data input is through socket $S_2$ and through winding 26 of core 22 and then through a return circuit to socket $S_3$, there also being a connection directly to pin $P_3$. Socket $S_4$ is connected directly to pin $P_4$ and this circuit is not necessary, but is shown as an example of providing an extra socket and pin which may be useful in the future development of the circuit and also provides further mechanical rigidity. Pin $P_2$ is connected between the output rectifiers of core 24 and it will be apparent that the output of core 24 is thus translated over to engagement socket $S_2$ of the next above unit to serve as the data input.

It will now be apparent that the passage of data through a stack will be as shown in Figure 4*a*. That is, the data will move from core 22 to core 24 and a given unit will thence be transferred from pin $P_2$ to socket $S_2$ of the next above unit to travel the course indicated by the arrows 40 in Figure 4*a*.

Referring now to Figures 5–9, the novel manner of constructing the base 10 and cover 12 for receiving the cores, rectifiers, sockets, and pins is shown in detail. Looking down on the base 10 with cover 12 removed as in Figure 5, a chamber 41 including two wells 42 and 44 is provided, each well having upstanding annular posts 46 about which cores 22 and 24 are received. Each core has wound on it the windings mentioned in connection with Figure 4. Apertures 48 within the posts 46 may receive the hollow rivets 20 for holding the cover 12 to the base 10 and for permitting stacking rods (not shown) to be passed therethrough. Additional rods through the other stacking rivets 20 as shown in Figure 1 may cooperate with the just mentioned rods through the cores to equalize the stacking pressures as is desirable.

A flexible gasket 52 is arranged to completely overlie all of the components as shown in Figure 5, with only tight-fitting apertures for passing therethrough the conductors leading to pins $P_1$—$P_5$. The tops of the posts 46 serve to provide the moisture-proof integrity of the unit by providing a tight engagement of the gasket about the hollow rivets.

At the edge of the units opposite from the cores, the rectifiers are housed in a novel manner by providing what may be best termed a channel 54 (Fig. 7) running parallel with the edge. Reading from left to right as viewed in Figures 4, 5 and 7, there is a first right angle shaped electrode 56, the rectifier disc 32, a tab 58 which is part of terminal $T_1$, the rectifier disc 34, a compression spring 60, a tab 62 which is part of terminal $T_2$, a further spring 64, the rectifier disc 36, a tab 66 which is part of the terminal $T_3$, the rectifier disc 38 and a second right angle electrode 68.

The terminals $T_1$—$T_3$, which appear at the outside of the unit, are interconnected with the above mentioned tabs 58, 62 and 66, by flat sections 70 (Figs. 4, 5 and 7) which pass over the top 72 of the edge of the base 10. The moisture-proof integrity of the unit is maintained at these points by providing notches in a ridge or lip 74 (Figs. 5 and 8) which encircles the top edge of base 10. A strip gasket of flexible material 76 is laid beneath the flat members 70 in this region. The result is that tight clamping of the cover to the base causes the flexible members 52 and 76 lying above and below the members 70 to squeeze together tightly about the members 70 to provide a moisture-proof joint.

Due to the nature of the circuit, terminal $T_1$ should be connected with the socket $S_3$-pin $P_3$ circuit. According to this invention, this is accomplished by having an extension 80 on terminal $T_2$ which may extend inwardly and be directly soldered to the top of socket $S_3$ within the unit.

Reference to Figures 5 and 8 shows that the sockets 16 extend upwardly into the interior of the housing where solder connections may be made to the tops of the sockets as at 82. A similar solder connection may be made as at 84 to the innermost end of the pins 14. However, the gasket 52 will intervene to prevent any electrical engagement therebetween. As previously indicated, it will be observed that considerable space exists within the unit for inclusion of small electrical resistors if such are necessary over and above the inherent resistance of the windings, to provide the necessary resistance in the circuit.

From the foregoing, it will be clear that by the present invention a circuit of the above referred to type is compactly arranged in a novel manner providing ready stackability of units in any desired quantity. The circuitry is protected against moisture, and is readily pluggable into other equipment as desired.

What is claimed is:

1. A circuit housing for a magnetic core memory circuit having two cores, each core having an advancing winding, a data input winding and a read-out winding thereon and with two rectifier elements in the read-out circuit of each core; a first housing part comprising a base having therein a chamber defining wells for receiving the cores substantially at two corners thereof, a channel at the opposite edge of the base for receiving the rectifier elements in combination with three terminal tabs and two compression springs and two electrodes, the electrodes being positioned at opposite ends of the channel, the terminal tabs being connected with terminal ends positioned exteriorly of the base, a plurality of connector sockets opening outwardly of the bottom of the base, the sockets extending interiorly of the base in a row positioned between the cores and the rectifier channel, a cover for overlying the base, at least four connector pins extending exteriorly of the cover when same is assembled on the base, the pins being aligned with the sockets, the arrangement being such that a number of units comprising bases and covers as described may be stacked by insertion of the pins of one unit into the sockets of another, the electrical circuit connections being characterized by interconnection of corresponding socket-pin pairs through the advancing windings of the respective cores so that when units are stacked a first advancing pulse applied to one ot the socket-pin pairs will energize the advance windings of correspondingly positioned cores throughout the stack, and a second advancing pulse applied to the other of the socket-pin pairs will energize the advancing windings of the other correspondingly positioned cores throughout the stack, the electrical connections being further characterized by the read-out circuit of one core of a given housing being connected to a given pin positioned to engage a socket of a further housing stacked thereon, so as to apply the read-out of said given core of one unit to the input winding of the other core of the next housing, the arrangement being such that in a stack of said circuit housings the data applied to the input of the circuit of the first housing of the stack will be transferred to the other core of the first housing, and will then be transferred forward and laterally to the first core of the second housing, then to the second core of the second housing, and so forth.

2. A stack of housings as recited in claim 1.

3. In a housing for a magnetic circuit adapted to be stacked with a plurality of similar circuit housings, a base portion, a covering portion peripherally congruent with said base member forming said housing, a first area of said housing as formed and adjacent to one side thereof having positioned therein two transversely aligned annular magnetic cores, a second area of the housing adjacent a second side thereof which is opposite to said one side having positioned therein two pairs of rectifying elements, a plurality of aligned electrical connection members of a first class fixed in the base portion in a third area between said first area having said cores and the second area having said rectifying elements, and a plurality of aligned connection members of a second class which are complementary to those of said first class fixed in the cover portion and each in further alignment with the connection members of the base portion, the respective connection members of the base and cover portion being aligned so that similar circuit housings may be congruently stacked.

4. A housing as in claim 3 wherein the cover portion and the base portion are separate, and means for securing said separate portions together.

5. A circuit housing as in claim 3 and further including stacking rod apertures in the base and cover portions in alignment with each other and further in alignment with the centers of said annular cores.

6. A circuit housing as in claim 5 and further including additional stacking rod apertures in the base and cover portions in alignment with each other and positioned in proximity to the corners of the base and cover portions to either end of said area of the housing which receives the rectifier elements.

7. A circuit housing as in claim 3 and further including a plurality of terminals extending from the side of the circuit housing which is in proximity to the area of the housing in which the rectifier elements are positioned.

8. A circuit housing as in claim 7 wherein the terminals comprise flat portions extending through the edge of the assembled housing between the base and cover members, the housing further including a gasket coextensive with the housing retained between the base and cover members, and an auxiliary gasket lying along the edge of the housing through which said flat portions extend in position to sandwich the flat portions of the terminals between the first mentioned and auxiliary gaskets.

9. A circuit housing as in claim 3 wherein the area of the housing in which the rectifier elements are positioned is in the form of a transverse channel which includes a first electrode, a first rectifier disc, a first terminal tab, a second rectifier disc, a first spring, a second terminal tab, a second spring, a third rectifier disc, a third terminal tab, a fourth rectifier disc and a second electrode, in that order, the arrangement being such that the first and second electrodes are positioned adjacent portions of the housing forming the ends of said channel and said springs to press the remaining elements into firm engagement with each other.

10. A circuit housing as in claim 3 wherein each annular core carries an advancing winding, and wherein a first pair of complementary electrical connectors in the base and cover portions, respectively, are electrically connected through the advancing winding on one core, and a second complementary pair of said connectors are electrically connected together through the advancing winding on the other core.

11. A substantially square circuit housing having a top surface, a bottom surface, and four side surfaces, the thickness dimension of the housing being substantially less than the lateral dimensions thereof, a plurality of electrical connection members of a first class aligned in a row extending across said top surface of the housing substantially centrally thereof and parallel to two sides of the housing, a plurality of electrical connection members of a second class aligned in a row on the bottom surface of the housing and each in alignment with one of said connection members on the top surface, a plurality of terminals extending from one side of the housing, said one side having said terminals protruding therefrom being a side parallel to said aligned electrical connection members, and stacking rod apertures formed in said housing, two of said stacking rod apertures being positioned to one side of said aligned rows of electrical connection members, and the other two stacking rod apertures being positioned to the opposite side of said aligned electrical connection members.

12. A housing as in claim 9 wherein the two of said stacking rod apertures to the side of the aligned electrical connection members opposite to the said protruding terminals are spaced inwardly of the corners of said housing so as to pass through the centers of annular magnetic cores enclosed in said housing, and the two stacking rod apertures to the side of the aligned rows of electrical connection members adjacent to the extending ends of said terminal members are placed at the extreme corners of the housing.

References Cited in the file of this patent

UNITED STATES PATENTS

| | | |
|---|---|---|
| 2,028,717 | Hayden | Jan. 21, 1936 |
| 2,268,619 | Reid | Jan. 6, 1942 |

OTHER REFERENCES

Radi-Craft for January 1939, pages 400, 401 and 431.